(12) United States Patent
Rüttiger et al.

(10) Patent No.: US 7,482,912 B2
(45) Date of Patent: Jan. 27, 2009

(54) INDICATING INSTRUMENT WITH A GEAR INDICATOR

(75) Inventors: Anton Rüttiger, Wildflecken (DE); Jürgen Nauth, Burkardroth (DE)

(73) Assignee: Preh GmbH, Bad Neustadt/Saale (DE)

( * ) Notice: Subject to any disclaimer, the term of this patent is extended or adjusted under 35 U.S.C. 154(b) by 232 days.

(21) Appl. No.: 11/372,275

(22) Filed: Mar. 10, 2006

(65) Prior Publication Data

US 2006/0216675 A1    Sep. 28, 2006

Related U.S. Application Data

(63) Continuation of application No. PCT/EP2004/009989, filed on Sep. 8, 2004.

(30) Foreign Application Priority Data

Sep. 10, 2003    (DE) ................. 103 41 621

(51) Int. Cl.
*G06F 7/00* (2006.01)
*G06F 17/00* (2006.01)
*G06F 19/00* (2006.01)

(52) U.S. Cl. .................... 340/439; 701/64; 340/456

(58) Field of Classification Search ........... 340/815.44, 340/456, 457, 438, 439; 701/64
See application file for complete search history.

(56) References Cited

U.S. PATENT DOCUMENTS

| | | | |
|---|---|---|---|
| 4,150,497 A | | 4/1979 | Weber |
| 4,199,747 A | | 4/1980 | Miller et al. |
| 4,411,174 A | | 10/1983 | Yokoi et al. |
| 4,439,158 A | | 3/1984 | Weber |
| 5,017,916 A | * | 5/1991 | Londt et al. ............ 340/870.13 |
| 5,521,986 A | * | 5/1996 | Curtin et al. ................ 382/187 |
| 6,462,651 B1 | * | 10/2002 | Consiglio et al. ........... 340/456 |
| 6,567,735 B1 | * | 5/2003 | Bortfeld et al. ................ 701/52 |
| 6,658,339 B1 | * | 12/2003 | Wright et al. ................. 701/53 |
| 6,707,379 B2 | * | 3/2004 | Nagasaka .................... 340/456 |
| 6,950,015 B2 | * | 9/2005 | Lo .............................. 340/441 |
| 7,161,569 B2 | * | 1/2007 | Sekiguchi ..................... 345/87 |
| 7,167,085 B2 | * | 1/2007 | Meyer et al. ................. 340/456 |
| 2002/0017232 A1 | | 2/2002 | Wehner |
| 2003/0164756 A1 | * | 9/2003 | Hayashi et al. ............. 340/439 |
| 2005/0237172 A1 | * | 10/2005 | Boomershine, III ......... 340/467 |

FOREIGN PATENT DOCUMENTS

| | | |
|---|---|---|
| DE | 29 23 986 | 3/1980 |
| DE | 36 13 201 A1 | 10/1987 |
| DE | 38 32 970 A1 | 4/1990 |
| DE | 43 12 266 A1 | 10/1994 |
| DE | 197 39 626 A1 | 6/1998 |

(Continued)

*Primary Examiner*—George A Bugg
*Assistant Examiner*—Jennifer Mehmood
(74) *Attorney, Agent, or Firm*—Muncy, Geissler, Olds & Lowe, PLLC

(57) ABSTRACT

An indicating instrument including at least one display unit including display segments that are used to represent a currently engaged gear and a background surrounding the display segments, and a control circuit configured to apply a first signal having a first polarity to the display segments and a second signal having a second polarity opposite to the first polarity to the background such that the display segments and the background have different contrasts to indicate the currently engaged gear.

19 Claims, 2 Drawing Sheets

FOREIGN PATENT DOCUMENTS

| | | |
|---|---|---|
| DE | 197 57 564 A1 | 7/1999 |
| DE | 200 14 731 U1 | 2/2002 |
| DE | 100 46 909 A1 | 4/2002 |
| EP | 0 926 468 | 6/1999 |
| EP | 1 195 300 A1 | 4/2002 |
| WO | WO 03/038791 A2 | 5/2003 |

* cited by examiner

INDICATING INSTRUMENT WITH A GEAR INDICATOR

This nonprovisional application is a continuation application of PCT/EP2004/009989, which was filed on Sep. 8, 2004, and which claims priority to German Patent Application No. DE 103 41 621.8, which was filed in Germany on Sep. 10, 2003, and which are both herein incorporated by reference.

BACKGROUND OF THE INVENTION

1. Field of the Invention

The present invention relates to an indicating instrument such as an indicating instrument in a motor vehicle, which includes at least one digital display unit displaying an indication about what gear is currently being used and/or that a gear shift operation is required.

2. Description of the Background Art

Motor vehicles, particularly those with automatic transmissions, generally includes indicators to visually indicate to the operator which gear is currently engaged. For example, the German patent publication DE 100 46 909 A1 illustrates an indicating instrument that displays the engaged gear in a separate region and also displays other functions such as a tachometer and speed sensor in other regions of the instrument. In another example, the German patent publication DE 197 57 564 A1 illustrates the gear indicator being displayed with the speedometer.

In addition, the German patent publication DE 197 39 626 A1 discloses a display unit displaying a limited predefined character set. In this publication, the display unit is a Liquid Crystal Display (LCD) and displays the selected gear on a screen portion of the display unit. A light component such as a light-emitting diode (LED) or a light bulb can also be integrated into the display unit. The LED can be used to indicate a warning signal to the operator. The LED or light bulb can also be used to illuminate the display unit. Further, the German patent publication DE 29 23 986 describes an optimal shift control process for a manual transmission. That is, the optimal shift time for shifting gears is displayed to the operator.

SUMMARY OF THE INVENTION

It is therefore an object of the present invention to provide an indicating instrument for a motor vehicle that clearly points out the shift functions to the vehicle operator.

Another object of the present invention is to provide an indicating instrument that can be cost-effectively manufactured and that can be integrated in a simple manner into the available electronics and display devices within the vehicle.

To achieve these and other objects, the present invention provides in accordance with one aspect an indicating instrument including at least one display unit including display segments that are used to represent a currently engaged gear and a background surrounding the display segments, and a control circuit configured to apply a first signal having a first polarity to the display segments and a second signal having a second polarity opposite to the first polarity to the background such that the display segments and the background have different contrasts to indicate the currently engaged gear.

In another aspect, the present invention provides an indicating instrument including at least one display unit having a first display portion configured to indicate a currently engaged gear, and a second display portion surrounding the first display portion, and a control circuit configured to apply a first signal to the first display portion and a second signal to the second display portion such that the first and display portions have a different illumination characteristic to thereby display the currently engaged gear.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
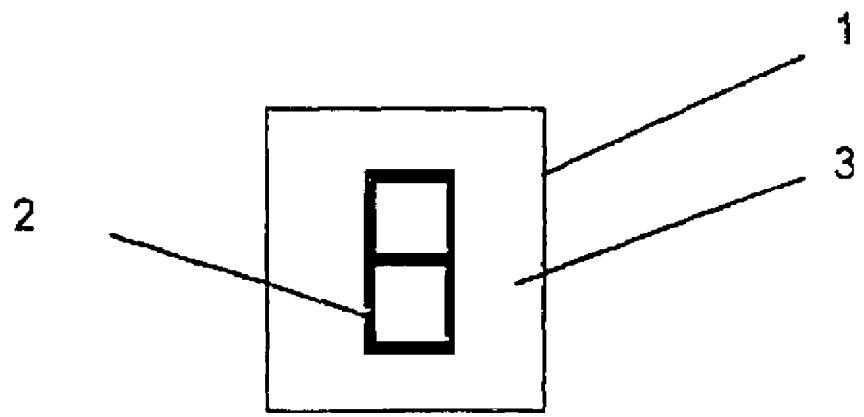
FIG. 1 is an overview illustrating an indicating instrument unit in accordance with one embodiment of the present invention.
Figure 3:
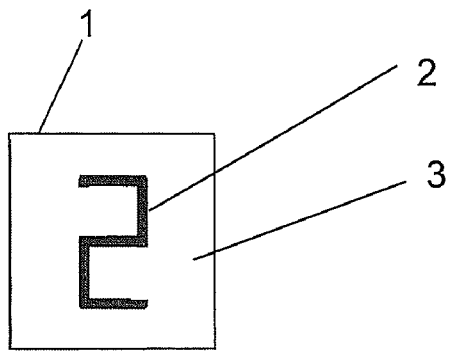
FIG. 3 is an overview illustrating an indicating instrument indicating a current gear is the second gear.
Figure 4:
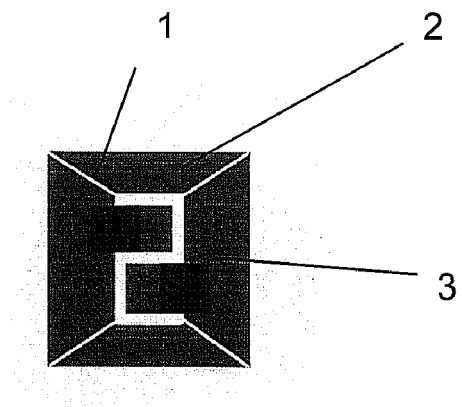
FIG. 4 is an overview illustrating the indicating instrument in FIG. 3 indicating to the operator that the gear needs to be shifted.

The present invention will now be described with reference to FIGS. 1-4. In more detail, FIG. 1 illustrates an indicating instrument including a display unit 1 having seven display segments 2 and a background 3. As shown FIG. 1, the seven display segments 2 are darkened and the background 3 is bright. Further, the seven segments 2 are used to represent a number corresponding to what gear is currently engaged (note FIGS. 3 and 4 illustrate the indicating instrument indicating the current gear is the 2nd gear). That is, the seven display segments represent the numeral "8" when all are activated and each segment can be activated or deactivated to represent the numerals "1", "2", etc.

In accordance with one embodiment of the present invention, the seven display segments 2 are positively wired to thereby display dark lines, and the background is negatively wired to display a bright background. That is, the display segments 2 and the background 3 have opposite polarities. In addition, the polarities of the display segments 2 and the background 3 are switched to thereby make the display unit 1 flash the gear number to the operator. The gear number is flashed to the operator when a shift operation is required. Thus, the operator can easily visualize a gear shift operation is required.

Figure 2:
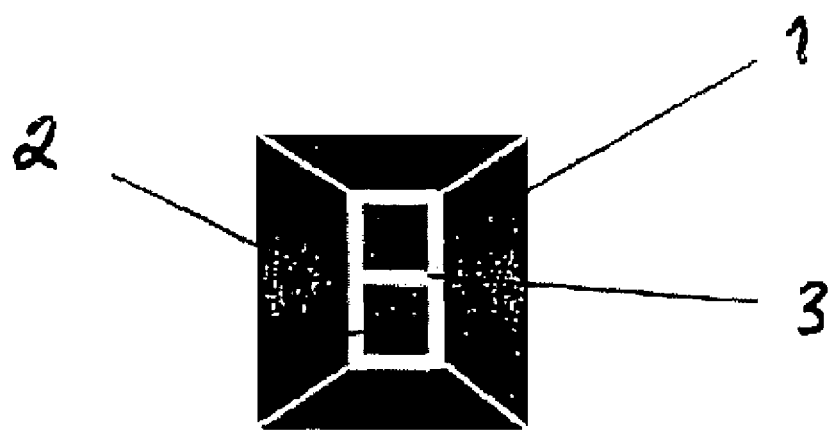
FIG. 2 an overview of the indicating instrument in FIG. 2 with additional darkened surrounding segments.

For example, FIG. 2 illustrates the polarities of the display segments 2 and the background 3 being switched from positive/negative, respectively, to negative/positive, respectively. Thus, as shown in FIG. 2, the display segments 2 have a positive polarity and thus are displayed as bright lines. Similarly, the background 3 has a negative polarity and thus is displayed as a dark background. Switching between the states shown in FIGS. 1 and 2 results in the display unit flashing between the two states. Thus, the operator of the vehicle would be informed about the engaged gear. Further, the display unit 1 is preferably used in an instrument cluster for a motorcycle.

Turning next to FIGS. 3 and 4, which are similar to FIGS. 1 and 2, respectively, but illustrate that the engaged gear is the 2nd gear. As shown in FIGS. 3 and 4, when the polarities of the display segments 2 and the background 3 are switched, the number "2" indicating the 2nd gear is flashed on the instrument panel. Thus, the operator is informed about the engaged gear.

Therefore, in accordance with one embodiment of the present invention, the display unit 1 includes seven display segments 2 that are used to represent a gear number in the motor vehicle. The polarities of the background 3 and display segments 2 are also alternated to produce a flashing effect to thereby notify the operator about the current engaged gear number. Thus, the present invention advantageously provides a single seven-segment display element in an indicating instrument for a motor vehicle that is cost-efficiently produced. Further, the vehicle driver can easily read the engaged gear.

In addition, the seven display segments 2 may be formed using seven LEDs that are operated independently from each other such that the numbers "1", "2", "3", "4", "5", etc. may be displayed to the user to indicated the currently engaged gear. Further, the background 3 may be formed using additional segments that are arranged around the display segments 2. Thus, it is possible to highlight and darken the display segments 2 and the background 3 by applying positive or negative polarities to the LEDs of the corresponding segments. Further, as shown in FIGS. 1-4, the segments for the background 3 completely fill the area of the display unit 1. Thus, when the background 3 is highlighted, the dark lines representing the display segments 2 particularly stand out to the operator of the vehicle.

Figure 5:
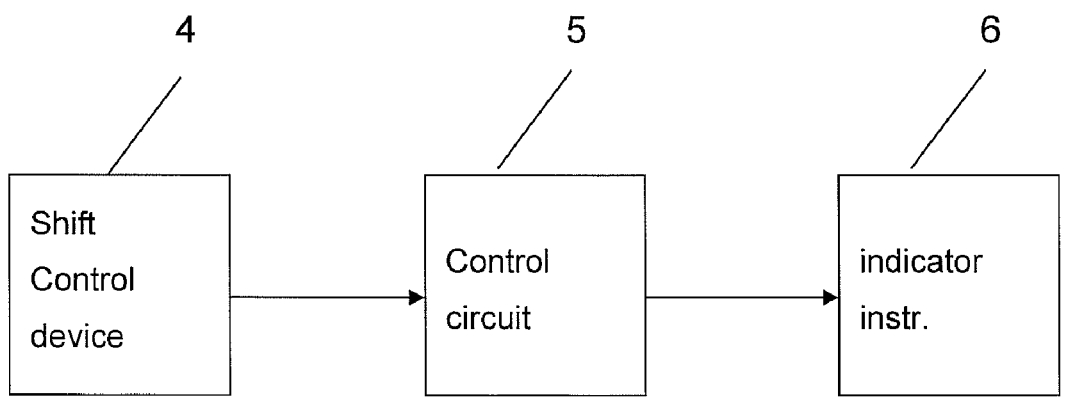
FIG. 5 is a block diagram illustrating a shift control device operating with the indicating instrument in accordance with one embodiment of the present invention.

Further, it is particular advantageous, especially in motorcycles, to visually inform the operator that a shifting operation to another gear is required. Thus, in accordance with one embodiment of the present invention, as shown in FIG. 5, a shift control device 4 reads optimal operating conditions from different values representing a state of the engine and thus determines the best time to shift into another gear. The shift control device 4 then transmits a signal to a control circuit 5 operating together with an indicating instrument 6. The indicating instrument 6 includes the display unit 1 shown in FIGS. 104. Further, the control circuit 5 informs the indicating instrument 6 to indicate that the current gear should be optimally shift to a higher or lower gear.

That is, when the control circuit 5 receives the shift signal from the shift control device 4, the control circuit 5 switches the polarities of the wiring of the display segments 2 and background 3 including in the display unit 1 of the indicating instrument 6. Thus, the currently engaged gear is flashed as shown in FIGS. 2 and 4 (i.e., the gear numbers are highlighted). The vehicle driver thus receives a visual signal that this is now the best time to shift to the next higher or, if applicable, lower gear. The polarities may also be switched back and forth to make the display unit 1 flash the engaged gear number several times to inform the operator to shift the gear.

In addition, the signals applied to the display segments 2 may be pulse signals from the control circuit 5. Further, the control circuit 5 may also create a more or less intense flashing of the display unit 1 by adjusting a pulse/pause ratio between shifting of the polarities. Thus, the present invention advantageously is able to notify the operator of the vehicle that the time for optimal shifting is approaching by uses long pauses between the flashes of the display unit 1. Similarly, the operator may be notified that a higher or lower gear should immediately be used by using short pauses between the display unit 1 (to provide rapid flashing of the display unit 1). Obviously, the short and long pulses may be used to provide the opposite procedure.

In addition, only certain subsections of the display unit 1 may be applied an alternating polarity such that the display unit 1 flashes only on one side or in the upper and lower area. Also, different operational functions such as shifting up and down or shifting over several gears can be indicated by these visual effects. In addition, the indication instrument of the present invention may also be easily integrated into an existing instrument panel. Further, the alternately bright and dark changes of the display unit 1 are preferably predefined by the pulse/pause ratio of the control circuit. Further, multiple display unit 1 may be used to provide enhanced features. Alphanumeric displays can also be used. In addition to the display of alphanumeric symbols, it is also possible to display graphic symbols. For example, in a commercial vehicle sector such as an agriculture vehicle, the engaged gears may be represented by graphic symbols such as a hare, turtle, etc. In this instance, the graphic symbols can be highlighted/darkened as discussed above to indicate a change in gears is needed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An indicating instrument, comprising:
   at least one display unit including display segments that are used to represent a currently engaged gear, and a background surrounding each of the display segments; and
   a control circuit configured to apply a first signal having a first polarity to the display segments and a second signal having a second polarity opposite to the first polarity to the background such that the display segments and the background have different contrasts to indicate the currently engaged gear,
   wherein the first polarity of the first signal is a positive polarity so the display segments are displayed as being dark, and the second polarity of the second signal is a negative polarity so the background is highlighted;
   wherein the display unit is connected to a shift control device that determines an optimal shift time and sends a signal to the control circuit indicating the optimal shift time, and
   wherein the control circuit reverses the first and second polarities of the first and second signals at or before the optimal shift time so the display segments are highlighted and the background is displayed as being dark.

2. The indicating instrument according to claim 1, wherein the control circuit alternately reverses the first and second polarities of the first and second signals so the display unit flashes the currently engaged gear.

3. The indicating instrument according to claim 2, wherein the first and second signals comprise pulse-shaped signals, and the control circuit adjusts a pulse/pause ratio of the first and second signals so the display unit slowly or quickly flashes the currently engaged gear.

4. The indicating instrument according to claim 1, wherein the background includes a plurality of background segments and the second signal includes a plurality of signals each respectively applied to the plurality background segments, and wherein the control circuit changes a polarity of a predetermined number of the plurality of signals applied to the plurality of background segments such that only a subsection of the display unit flashes.

5. The indicating instrument according to claim 1, wherein the background completely fills the at least one display unit.

6. The indicating instrument according to claim 1, wherein the display segments comprise seven display segments used to represent a numeral corresponding the currently engaged gear.

7. The indicating instrument according to claim 1, wherein the display segments represent a alphanumeric symbol corresponding to the currently engaged gear.

8. The indicating instrument according to claim 1, wherein the display segments represent a graphic symbol corresponding to the currently engaged gear.

9. The indicating instrument according to claim 1, wherein the display unit is part of an instrument cluster for a motorcycle.

10. The indicating instrument according to claim 9, wherein the display unit displays currently engaged gears for a manual transmission in the motorcycle.

11. A method for indicating an optimal shift time for a motor vehicle with a manual transmission, comprising: determining the optimal shift time using a shift control device included in the motor vehicle; transmitting a signal corresponding to the optimal shift time to a control circuit controlling an indicating instrument, said indicating instrument having at least one display unit including display segments that are used to represent a currently engaged gear, and a background surrounding the display segments; applying, via the control circuit, a first signal having a first polarity to the display segments and a second signal having a second polarity opposite to the first polarity to the background such that the display segments and the background have different contrasts to indicate the currently engaged gear; and alternately reversing, via the control circuit, the first and second polarities of the first and second signals so the display unit flashes the currently engaged gear to indicate the optimal shift time.

12. The method according to claim 11, wherein the first and second signals comprise pulse-shaped signals, and the control circuit adjusts a pulse/pause ratio of the first and second signals so the display unit slowly or quickly flashes the currently engaged gear.

13. An indicating instrument, comprising:
at least one display unit including a first display portion configured to indicate a currently engaged gear and which includes a plurality of individual display elements, and a second display portion which surrounds each of said individual elements of the first display portion; and
a control circuit configured to apply a first signal to the first display portion and a second signal to the second display portion such that the first and second display portions have a different illumination characteristic to thereby display the currently engaged gear.

14. The indicating instrument according to claim 13, wherein the first signal has a first polarity and the second signal has a second polarity that is opposite to the first polarity so the first display portion is displayed as being dark, and the second display portion is highlighted.

15. The indicating instrument according to claim 14, wherein the display unit is connected to a shift control device that determines an optimal shift time and sends a signal to the control circuit indicating the optimal shift time, and wherein the control circuit reverses the first and second polarities of the first and second signals at or before the optimal shift time so the display segments appear bright and the background appears dark.

16. The indicating instrument according to claim 14, wherein the control circuit alternately reverses the first and second polarities of the first and second signals so the display unit flashes the currently engaged gear.

17. The indicating instrument according to claim 13, wherein the first and second signals comprise pulse-shaped signals having different polarities, and the control circuit adjusts a pulse/pause ratio of the first and second signals so the display unit slowly or quickly flashes the currently engaged gear.

18. The indicating instrument according to claim 13, wherein the first display portion includes at least one of display segments representing a numeral corresponding the currently engaged gear, an alphanumeric symbol corresponding to the currently engaged gear, or a graphic symbol corresponding to the currently engaged gear.

19. The indicating instrument according to claim 13, wherein the display unit is part of an instrument cluster for a motorcycle, and the display unit displays currently engaged gears for a manual transmission in the motorcycle.

\* \* \* \* \*